(12) United States Patent
Stasik

(10) Patent No.: US 12,344,144 B2
(45) Date of Patent: Jul. 1, 2025

(54) ARMREST ARRANGEMENT AND VEHICLE SEAT

(71) Applicant: Faurecia Autositze GmbH, Hannover (DE)

(72) Inventor: Dariusz Stasik, Warsaw (PL)

(73) Assignee: Faurecia Autositze GmbH, Hannover (DE)

( * ) Notice: Subject to any disclaimer, the term of this patent is extended or adjusted under 35 U.S.C. 154(b) by 83 days.

(21) Appl. No.: 18/312,254

(22) Filed: May 4, 2023

(65) Prior Publication Data

US 2023/0365038 A1    Nov. 16, 2023

(30) Foreign Application Priority Data

May 11, 2022   (DE) ...................... 10 2022 111 761.8

(51) Int. Cl.
*B60N 2/75* (2018.01)
(52) U.S. Cl.
CPC .................................. *B60N 2/763* (2018.02)
(58) Field of Classification Search
CPC ...... B60N 2/763; B60N 2/1615; B60N 2/773; B60N 2/767; B60N 2/77
USPC ...................................................... 297/411.39
See application file for complete search history.

(56) References Cited

U.S. PATENT DOCUMENTS

| | | | | |
|---|---|---|---|---|
| 4,165,901 A * | 8/1979 | Swenson | ................... | B60N 2/77 297/411.33 |
| 4,244,623 A * | 1/1981 | Hall | ........................ | A47C 1/03 297/162 |
| 4,307,913 A | 12/1981 | Spiegelhoff | | |
| 4,496,190 A * | 1/1985 | Barley | ................... | B60N 2/773 297/411.32 |
| 9,315,128 B2 * | 4/2016 | Lorey | ...................... | B60N 2/77 |

FOREIGN PATENT DOCUMENTS

| | | |
|---|---|---|
| DE | 102020110364 A1 | 11/2020 |
| DE | 102020117817 A1 | 4/2021 |
| EP | 1366987 A1 | 12/2003 |
| WO | 2020229135 A1 | 11/2020 |

* cited by examiner

*Primary Examiner* — Milton Nelson, Jr.
(74) *Attorney, Agent, or Firm* — Barnes & Thornburg LLP

(57) ABSTRACT

The present disclosure relates to an armrest arrangement for a vehicle seat including an armrest and a seating portion connection for connecting the armrest to a seating portion in such a way that the armrest can be adjusted via a kinematic construction in relation to the seating portion.

18 Claims, 5 Drawing Sheets

ARMREST ARRANGEMENT AND VEHICLE SEAT

PRIORITY CLAIM

This application claims priority to German Patent Application No. DE 10 2022 111 761.8, filed May 11, 2022, which is expressly incorporated by reference herein.

BACKGROUND

The present disclosure relates to an armrest arrangement as well as a vehicle seat including such an armrest arrangement.

SUMMARY

According to the present disclosure, an armrest arrangement as well as a vehicle seat allows for an automated and comfortable adjustment of an armrest at little expenditure.

In illustrative embodiments, an armrest arrangement for a vehicle seat comprises at least one armrest extending in a longitudinal direction for supporting an arm of a seat occupant and a seating portion connection for connecting the armrest to a seating portion of the vehicle seat such that the armrest can be adjusted in relation to the seating portion vi a kinematic construction or, respectively, a kinematics.

In illustrative embodiments, the armrest may be connected via a vertical bar to the seating portion connection in a manner pivoting about a pivot point, and a connecting rod guided by a guide element as part of the kinematic construction cooperating with the vertical bar in such a manner that upon movement of the seating portion connection in relation to the guide element a rotation of the armrest about the pivot point can be effected via the connecting rod. Hereby, the seating portion connection is firmly connected to the seating portion so that any movement of the seating portion automatically causes the armrest to swivel or tilt respectively via the kinematic construction.

In illustrative embodiments, the connecting rod may be in an operative connection with a seating portion coupling, different from the seating portion connection, in such a way that a rotation of the armrest about the pivot point via the connecting rod can be effected even when the seating portion coupling moves in a vertical direction in relation to the guide element. Therefore, the construction adjusting or, respectively, tilting the armrest is able to "tap" a motion at various points of the seating portion via the seating portion connection and via the seating portion coupling, when these are hinge coupled to the seating portion of the vehicle seat at corresponding different points.

In illustrative embodiments, it is possible, using a simple construction, to purposefully cause the armrest to turn upon an inclination or height adjustment of the seating portion of the vehicle seat, where the kinematic construction is preferably designed in such a way, i.e. the connecting rod being guided by the guide element in such a way and being operatively coupled with the seating portion coupling in such a way, that, when the seating portion is adjusted via the inclination adjustment means and/or via the height adjustment means from a default position in any tilt position and/or any lifted position, the orientation of the armrest changes by not more than a maximum of 5°, preferably a maximum of 4°, in relation to the orientation of the armrest when set to the default position. Hereby, tilt position shall be understood as a tilted or inclined position of the entire vehicle seat in which both the seating portion and the backrest are tilted about a common pivot axis.

In contracts hereto, a further inclination adjustment can be realized in that the backrest hinged to the seating portion via fittings can be swiveled in relation to the seating portion about a second pivot axis defined by the fittings. In this case, however, the inclination of the armrest remains unchanged because the seating portion is not swiveled or tilted along, and therefore, likewise, the armrest does not change its orientation. Therefore, preferably, it is provided that the orientation of the armrest can change only when the inclination and/or the height of the seating portion is adjusted. According to the present disclosure, this adjustment of the orientation of the armrest will be compensated almost entirely via the kinematic construction, where the aforementioned change of not more than a maximum of 5°, preferably a maximum of 4°, is acceptable under consideration of comfort in view of the fact that the armrest may incline up to 20° or more. With such small angular positions of less than or equal to 5°, preferably smaller than 4°, the arm of the seat occupant is still tilted so little that any issues with blood circulation and thereby numbness of the hands can be avoided.

In illustrative embodiments, the guide element may have a first long hole, in which the connecting rod is received in a hinged manner via a first point, the connecting rod being articulately joined, at its end opposite the first point, indirectly or directly to the vertical bar. This way it is possible to provide a simple guide via the first long hole, the first long hole extending angled in relation to the vertical direction and the longitudinal direction. Hereby, advantageously, it is possible to compensate for the swivel motion of the seating portion caused by a height adjustment and/or an inclination adjustment of the seating portion or, respectively, the vehicle seat resulting from a pivoting action of swing arms and linkages. Then, using this type of guide, the orientation of the armrest is approximately maintained.

In illustrative embodiments, a connector piece may be guided in the first long hole of the guide element via the first point and a second point different from the first one, the movement of the piece being coupled via the first point with the movement of the connecting rod. Thus, the kinematic construction is expanded in that the connector piece is also guided by the guide element, while the connector piece further comprises a second long hole extending in a vertical direction in which a connecting piece connected to the seating portion coupling is guided in such a way that movement of the seating portion coupling in a vertical direction is limited by an upper stop being the upper border of the second long hole and by a lower stop being the lower border of the second long hole.

This way, it is possible to create the operative connection between the seating portion coupling and the connecting rod, where the effect of the stops is that movement of the connector piece and therewith a change in motion of the connecting rod will follow only if there is a height adjustment of the seating portion. Moreover, it is then possible, starting from a certain height adjustment, to transfer an adjustment of the seating portion, caused by pivoting movement of the swing arms of the height adjustment means, via a retroactive effect on the connecting rod also to the armrest which thereupon tilts accordingly about the pivot point. Thus, by means of appropriate settings of the stops, the angles and the lengths of the two long holes it is possible to purposefully react to the respective action of the seating portion upon inclination and/or height adjustment.

In illustrative embodiments, the armrest may be received in an armrest guide via a triangular support comprising the vertical rod, preferably via an armrest connection, and for the connecting rod to be hinged to the underside of the armrest guide in such a way that via the connecting rod a rotation of the armrest guide and the armrest received therein about the pivot point can be effected, when the seating portion connection moves in relation to the guide element and/or the seating portion coupling moves in a vertical direction in relation to the guide element. This way, it is possible to allow for a flexible attachment of the armrest, wherein the armrest is also supported towards the rear.

In illustrative embodiments, the armrest may be guided in the armrest guide via the armrest connection in a rail-type manner along a guide direction for adjusting the armrest in relation to the armrest guide, where the armrest connection can be fixed within the armrest guide for defining the position of the armrest relative to the armrest guide. This way kt is possible, for example, to purposefully adapt the armrest in its default position to a size of the seat occupant.

In illustrative embodiments, the vehicle seat comprises a seating portion, a backrest and an armrest essentially extending in a longitudinal direction as part of an armrest arrangement, in particular, of an armrest arrangement according to the present disclosure, where the seating portion and the backrest can be tilted together via an inclination adjustment means about a first pivot axis in relation to a seat mount, and/or can be adjusted via a height adjustment means in a vertical direction in relation to the seat mount, where the armrest is connected to a seating portion connection via a vertical bar in a manner rotatably about a pivot point, and the seating portion connection is firmly connected to the seating portion, and where a guide element is affixed to the seat mount, and a connecting rod guided by the guide element collaborates as part of a kinematic construction with the vertical bar in such a way that upon movement of the seating portion in relation to the seat mount a rotation of the armrest about the pivot point can be effected via the connecting rod, where, further, a seating portion coupling is hinged to the seating portion, the connecting rod being in operative connection with the seating portion coupling different from the seating portion connection in such a way that via the connecting rod a rotation of the armrest about the pivot point can be effected even when the seating portion with the seating portion coupling moves in a vertical direction in relation to the seat mount.

In illustrative embodiments, the armrest arrangement may be incorporated in a corresponding vehicle seat so that the orientation of the armrest will be adapted automatically upon movement of the seating portion in that a corresponding tilt movement of the seating portion is compensated via the guided connecting rod.

In illustrative embodiments, the seating portion coupling can move only in a vertical direction and the seating portion coupling is hinged onto the seating portion in such a way that the seating portion coupling does not move when the seating portion and the backrest are jointly tilted via the inclination adjustment means about the first pivot axis in relation to the seat mount. Therefore, any movement of the seating portion will be transferred via the seating portion coupling to the kinematic construction when it results in a height adjustment during which the seating portion is pivoted via swing arms. Thus, an inclination adjustment of the seating portion can be compensated by pivoting the connecting rod alone, while a height adjustment and the resulting swiveling motion of the seating portion is also compensated by an adjustment of the connecting rod guided by the guide element.

In illustrative embodiments, the seating portion coupling may be mounted in a gliding manner on a cross member connecting the lateral flanks of the seating portion, where, preferably, the first pivot axis runs coaxially in relation to the cross member. Thus, the height adjustment of the backrest can be tapped via already existing components and transferred to the kinematic construction, whereby the cross member remains unchanged upon an inclination adjustment thereby resulting in no retroactive effect on the kinematic construction in the case of a pure inclination adjustment.

In illustrative embodiments, the seat mount fest may be firmly affixable to the floor of a vehicle or to a rail system affixable to the floor for adjusting the vehicle seat in a longitudinal direction. This way, it is possible to affix the guide element to a component of the vehicle seat which does not move upon inclination and/or height adjustment, the result of this being, in a simple manner, a guided movement of the connecting rod upon any adjustment of the seating portion, and, thereby, the automatic alignment of the armrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
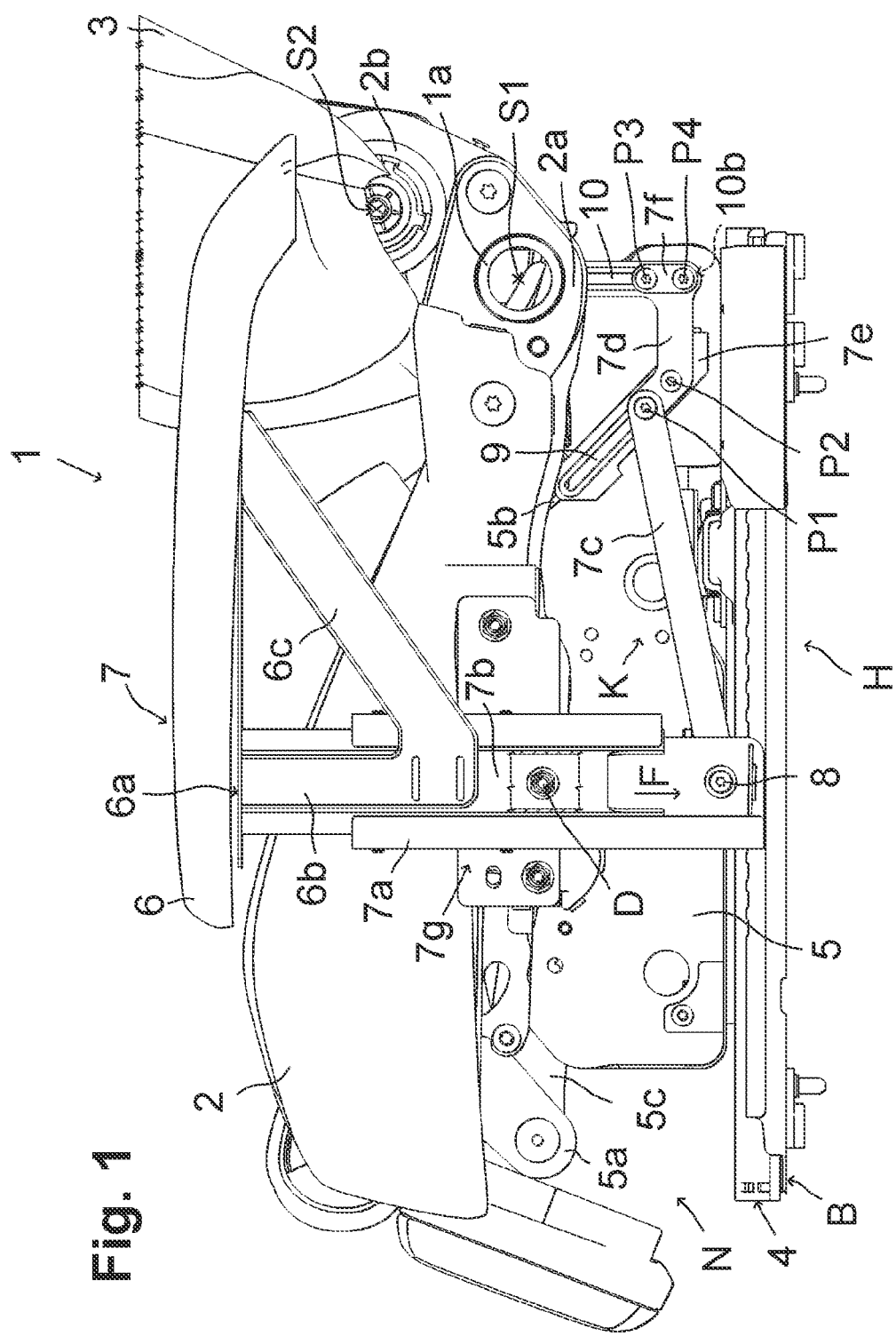
FIG. 1 shows a vehicle seat in an upright default position.

FIG. 1 shows a vehicle seat 1 comprising a seating portion 2 as well as a backrest 3. The entire vehicle seat 1 can be adjusted in inclination via an inclination adjustment means N about a first pivot axis S1, where, during such inclination adjustment, the seating portion 2 and the backrest 3 are swiveled jointly or together respectively about the first pivot axis S1. Hereby, for example, the first pivot axis S1 runs through a cross member 1a which firmly connects the two lateral flanks 2a of the seating portion 2 to one another. Moreover, the entire vehicle seat 1 can be adjusted in height or, respectively, in a vertical direction V in relation to a floor B of the vehicle via a height adjustment means H.

Besides this, a backrest inclination adjustment may be provided in which only the backrest 3 is adjusted about a second pivot axis S2 without titling also the seating portion 2 in the process. This happens, for example, via fittings 2b via which the backrest 3 is hinged on both sides onto the lateral flanks 2a of the seating portion 2 so that, additionally, a tilting of the backrest 3 in relation to the seating portion 2 is enabled. In the following, reference is made merely to those inclination adjustment means N in which also the seating portion 2 or, respectively, the entire vehicle seat 1 pivots about the first pivot axis S1.

Moreover, for longitudinal adjustment (in a longitudinal direction L), the vehicle seat 1 is mounted on the floor B of the vehicle via a rail system 4 comprising an upper rail and a lower rail, where the vehicle seat 1 is in operative connection with the rail system 4 via a seat mount 5 or a lower seat component respectively. In principle, however, such option for longitudinal adjustment of the vehicle seat 1 could be omitted or designed in some other way.

Moreover, for longitudinal adjustment (in a longitudinal direction L), the vehicle seat 1 is mounted on the floor B of the vehicle via a rail system 4 consisting of an upper rail and a lower rail, where the vehicle seat 1 is in operative connection with the rail system 4 via a seat mount 5 or a lower seat component respectively. In principle, however, such option for longitudinal adjustment of the vehicle seat 1 could be omitted or designed in some other way.

In the case at hand, the seat mount 5 is designed such that the orientation of the seat mount 5 remains unchanged upon height adjustment and inclination adjustment of the seating portion 2 or, respectively, the entire vehicle seat 1. To that end, front swing arms 5a and rear swing arms 5b are hinged onto the seating portion 2 or, respectively, the lateral flanks 2a on both sides (see FIG. 2), which swivel simultaneously upon actuation of the height adjustment means H. This will move the seating portion 2 via the lateral flanks 2a in a vertical direction V upwards or downwards (see FIG. 1 and FIG. 2). Due to the pivot action of the swing arms 5a, 5b any height adjustment always leads to a small movement of the seating portion 2 in a longitudinal direction L.

The rear swing arms 5b are hinged directly onto the seat mount 5, and the front swing arms 5a are hinged onto the seat mount 5 via additional linkages 5c. Upon actuation of the inclination adjustment means N the additional linkages 5c will pivot together with the front swing arms 5a independent of the rear swing arms 5b, resulting in an inclination adjustment of the vehicle seat 1 about the first pivot axis S1, as shown, by way of example, in FIG. 3.

The vehicle seat 1 shown here further comprises an armrest 6 as part of an armrest arrangement 7 which collaborates with both the seating portion 2 and the backrest 3 via a kinematic construction K (kinematics) to adapt an orientation of the armrest 6 relative to an occupant sitting in the seat to an inclination adjustment of the vehicle seat 1. Hereby, the goal is for the armrest 6 to always be aligned approximately horizontal or, respectively, in the (or approximately parallel to the) longitudinal direction L or, respectively, parallel to the floor B of the vehicle independent from the inclination adjustment of the vehicle seat 1.

Figure 1A:
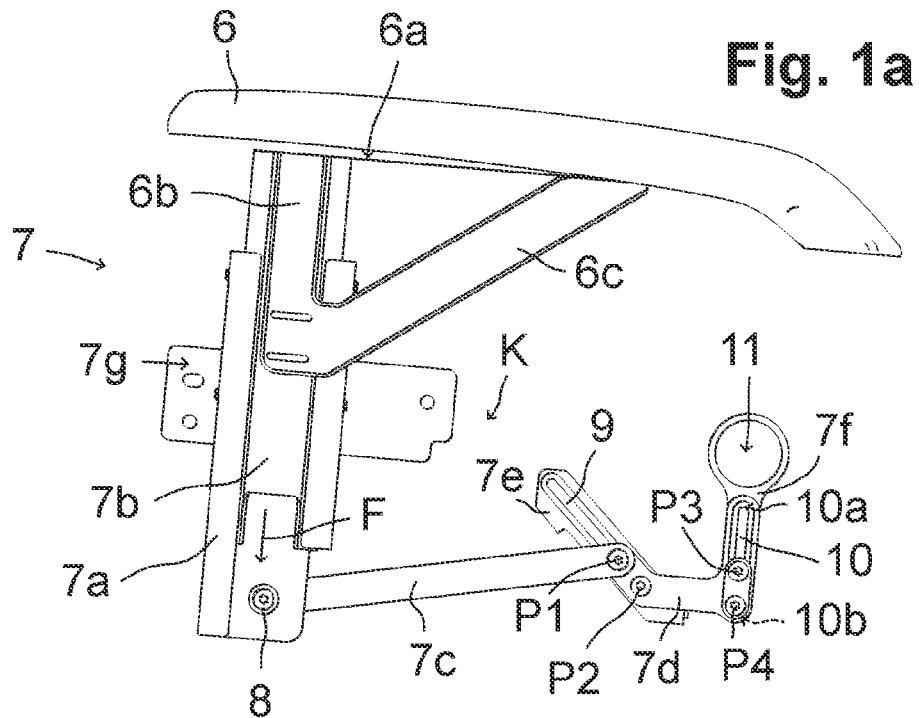
FIG. 1a shows an armrest arrangement of the vehicle seat according to FIG. 1 in an individual depiction.
Figure 1B:
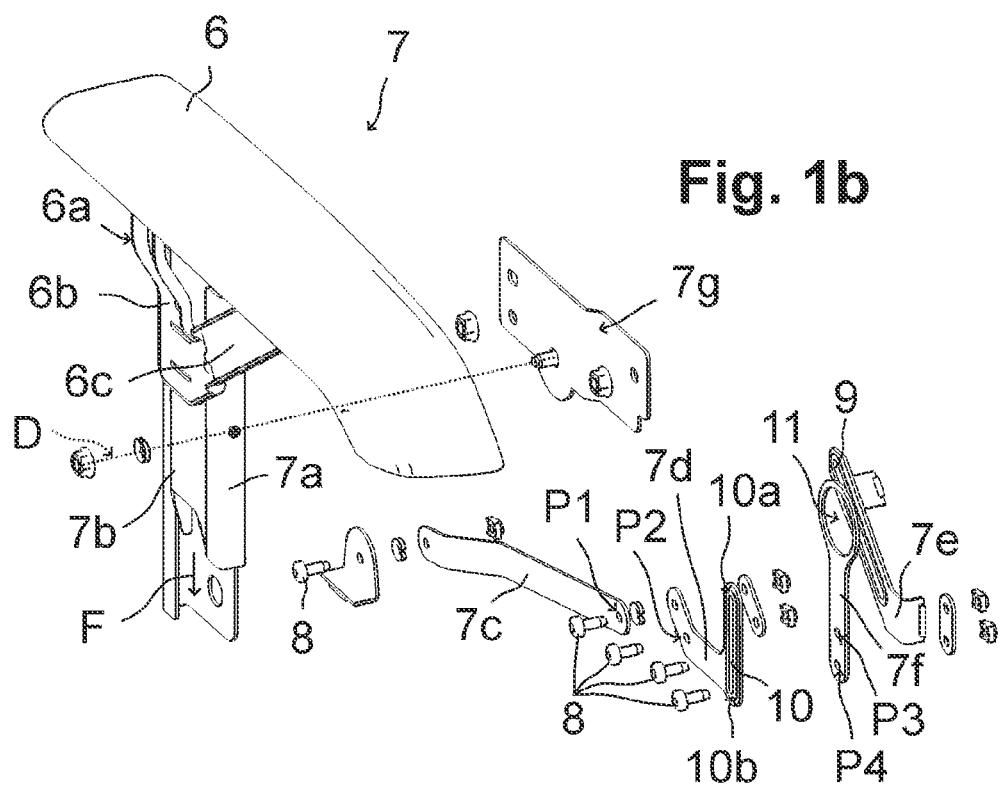
FIG. 1b shows the armrest arrangement according to FIG. 1a in an exploded view.

For this purpose, the armrest arrangement 7, shown in more detail in FIG. 1a and FIG. 1b, comprises an armrest guide 7a which is designed as a C profile at least in part, an armrest connection 7b received in the C profile in a manner sliding in a guide direction F, a connecting rod 7c, a (plate-like) connector piece 7d, a guide element 7e, a connecting piece 7f, and a seating portion connection 7g, which are in operative connection with the seating portion 2 a well as with the backrest 3 as follows:

Firstly, the armrest 6 is designed as a T shape, where the armrest 6 is connected via a triangular support 6a to a vertical bar 6b (in the guide direction F) and a diagonal bar 6c rigidly to the armrest connection 7b so that the armrest 6 is supported also towards the rear. The armrest connection 7b is guided rail-like inside the armrest guide 7a so that the armrest 6 can move only along the guide direction F. Normally, the armrest connection 7b is fixed inside the armrest guide 7a and will be released by a corresponding mechanism only when a height adjustment of the armrest 6 in relation to the seating portion 2 along the guide direction F is intended. Hereby, the guide direction F is oriented generally or essentially in a vertical direction V.

The guide direction F is further defined by the position of the armrest guide 7a, where the position of the armrest guide 7a may change. To that end, the armrest guide 7a is hinged onto the seating portion 2 at a pivot point D, shown in FIG. 1, via the seating portion connection 7g, i.e., the armrest guide 7a can swivel about this pivot point D in relation to the seating portion 2. Hereby, the pivot point D lies approximately in the middle of the armrest guide 7a so that the area of the armrest guide 7a lying below and above it make approximately equal lever arms.

The connecting rod 7c is hinged onto the underside of the armrest guide 7a, for example, via a screw bolt 8, and the opposite end of the connecting rod 7c is received together with the connector piece 7d, in a manner slidable in a first point P1, in a first long hole 9 in the guide element 7e, for example, via a screw bolt 8 (see FIG. 1b). The guide element 7e in turn is rigidly affixed to the seat mount 5 so that it will be moved both relative to the seating portion 2 and relative to the backrest 3, when a height adjustment is carried out via the height adjustment means H and/or an inclination adjustment via the inclination adjustment means N. Hereby, the first long hole 9 is oriented such that it extends diagonally upwards, i.e. having a directional component both in a longitudinal direction L and in a vertical direction V.

In addition to the first point P1 the connector piece 7d is also received in a second point P2 slidable in the first long hole 9, preferably via a screw bolt 8. Thereby, the connector piece 7d is fixed in its angular position relative to the guide element 7e, and, consequently, can move only without swiveling along the first long hole 9 (diagonally). The connecting rod 7c, on the other hand, which is only received the first point P1 slidable in the first long hole 9, is also able to swivel, both in relation to the connector piece 7d and in relation to the guide element 7e.

The connector piece 7d further comprises a second long hole 10 extending upwards in a vertical direction V in which the connecting piece 7f is slidable received via a third point P3 and a fourth point P4, preferably via two screw bolts 8. Here, too, the two-point connection serves to fix the angular position of the connecting piece 7f in relation to the connector piece 7d so that the connecting piece 7f can move within the second long hole 10 merely vertically upwards and downwards, between an upper stop 10a and a lower stop 10b.

At the upper side the connecting piece 7f is pivoting hinged via a seating portion coupling 11 (see FIG. 1a, 1b) onto the seating portion 2, for example, via the cross member 1a. Hereby, the seating portion coupling 11 is deigned such that the connecting piece 7f is able to swivel about the first pivot axis S1 in relation to the seating portion 2, for example; in that the seating portion coupling 11 is mounted in a sliding manner onto the cross member 1a. Since, upon inclination adjustment the entire vehicle seat 1 is tilted via the inclination adjustment means N about this first pivot axis S1, the connecting piece 7f remains unmoved in the event of a sole inclination adjustment of the vehicle seat 1, but just glides across the surface of the cross member 1a. Only in the case of a height adjustment of the vehicle seat 1 via the swing arms 5a, 5b, where there is also a height adjustment of the first pivot axis S1 (in a vertical direction V) in relation to the seat mount 5, will a movement, guided by the second long hole 10, (in a vertical direction V upwards or downwards) be transferred into the connecting piece 7f.

Figure 2:
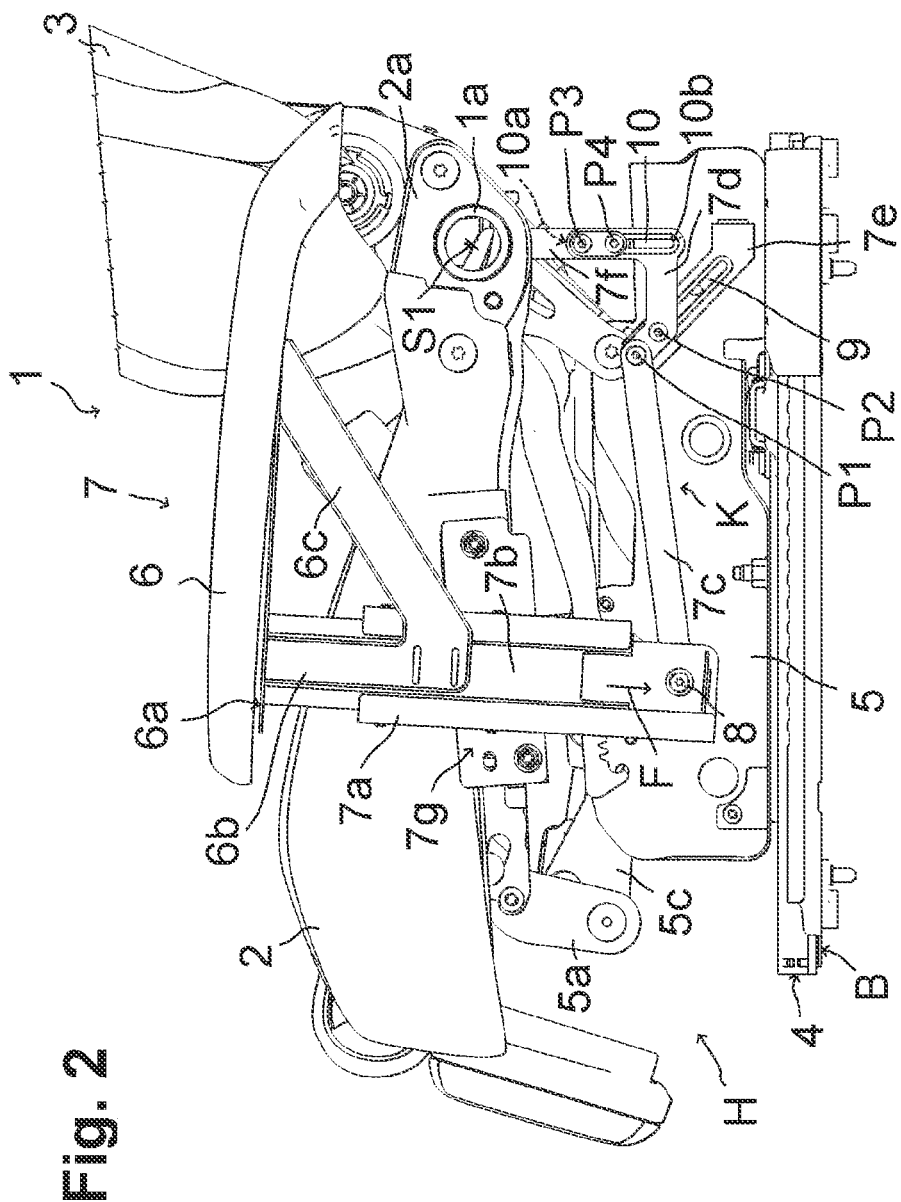
FIG. 2 shows the vehicle seat according to FIG. 1 in a raised position and still upright default position.

Using this kinematic construction K (kinematics) of the individual components within the armrest arrangement 7, there will be the following adjustment of the armrest 6 in an inclination adjustment and/or a height adjustment of the vehicle seat 1:

When the vehicle seat 1, starting from the upright default position (design position) shown in FIG. 1, is adjusted via the height adjustment means H vertically upwards into a maximally raised position according to FIG. 2, firstly, the connecting piece 7f will be displaced within the second long hole 10 as described above. At the same time, the seating portion 2 will cause the armrest guide 7a, which is rotatable hinged onto the seating portion connection 7g, to be moved vertically upwards also together with the armrest 6. From a certain height adjustment on, the connecting piece 7f will come into contact with the upper stop 10a at the second long hole 10. Hereby, the connecting piece 7f also drags the connector piece 7d along upwards, namely diagonally guided by the first long hole 9.

This also causes a motion to be transferred via the first point P1 to the connecting rod 7c. Hereby, the angle of the first long hole 9 (in relation to the longitudinal or vertical direction L, V) is adapted to the pivot motion of the swing arms 5a, 5b in a height adjustment in such a way that the longitudinal adjustment of the seating portion 2 and, therewith, the armrest guide 7a caused by this pivot action is also transferred via the first point P1 at the first long hole 9 to the connecting rod 7c. Hereby, in such a height adjustment, the connecting rod 7c does not or only slightly press against the underside of the armrest guide 7a and does not or only slightly pivot the armrest guide 7a about the pivot point D. Hereby, the armrest 6 remains in a generally or essentially horizontal orientation. In the embodiment example shown in FIG. 2, for example, the armrest 6 tilts only by approximately 3-4° in relation to the horizontal or, respectively, the longitudinal direction L or, respectively, the floor B, when this maximally raised position of the vehicle seat 1 is reached. Using a suitable other dimensioning of the kinematic constructions K this angle may also be purposefully adapted to the respective application case.

When the vehicle seat 1 is tilted from the upright default position (design position) shown in FIG. 1 via the inclination adjustment means N into a maximally titled tilted position in that the linkages 5c and the front swing arm 5a are swung out to the maximum, the seating portion 2 and the backrest 3 will jointly swivel about the first pivot axis S1, for example, by approximately 20° in relation to the default position. Because, in an adjustment of the inclination alone, the first pivot axis S1 or, respectively, the cross member 1a does not move the connector piece 7d is held via the connecting piece 7f in its position on the seat mount 5, whereby, for this purpose, the connecting piece 7f lies in contact with a lower stop 10b of the second long hole 10 and prevents displacement of the connector piece 7d along the first long hole 9.

Figure 3:
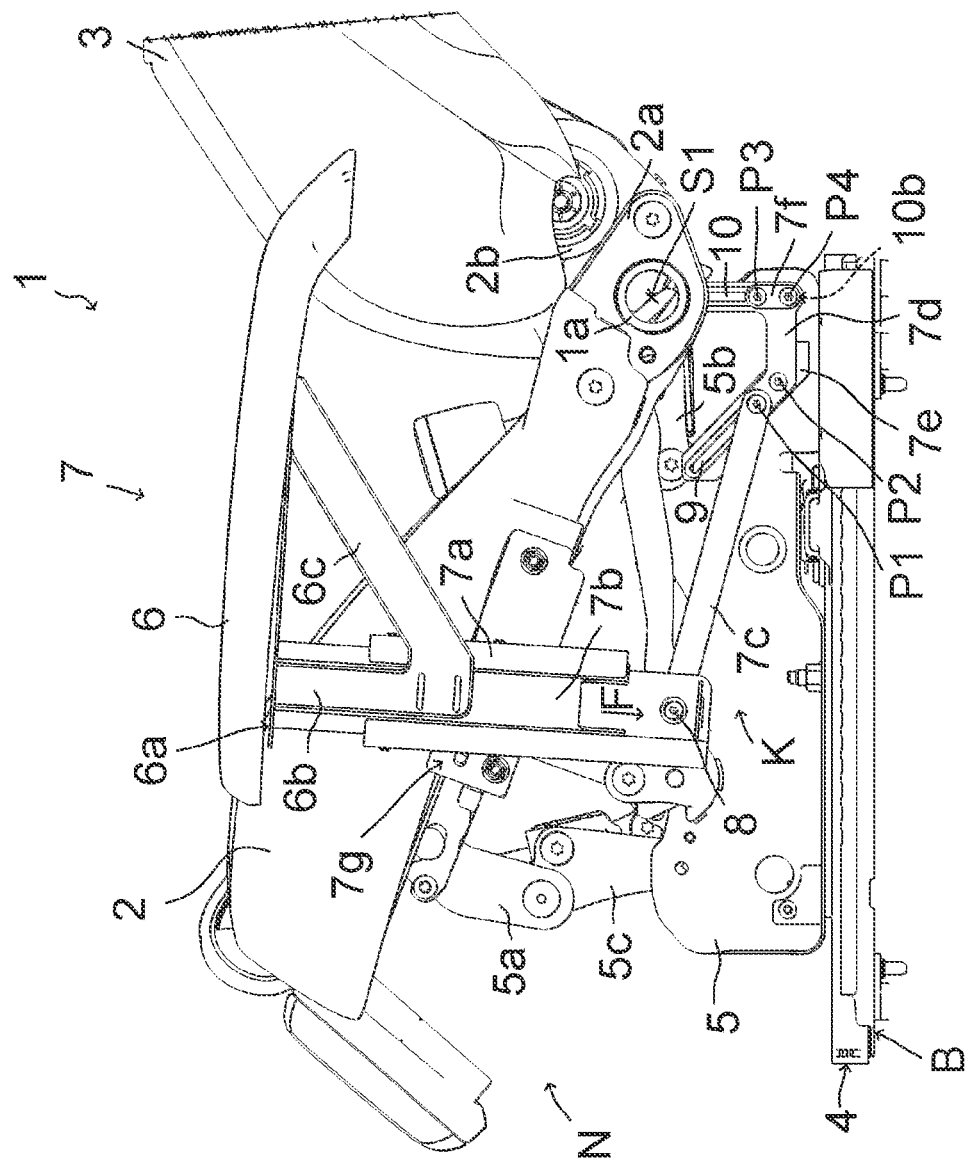
FIG. 3 shows the vehicle seat according to FIG. 1 in a tilted position.

Because the armrest guide 7a hinged via the pivot point D onto the seating portion 2 is carried along upwards by the seating portion connection 7g, the connecting rod 7c hinged thereto also pivots about the first point P1, however, without being displaced within the first long hole 9 in the process. This results in a rotational motion of the armrest guide 7a about the axis of rotation D in such a way that the armrest guide 7a remains tilted only slightly or, respectively, for example, 3-4°, in relation to the horizontal or, respectively, the longitudinal direction L, as shown in FIG. 3. Thus, the tilting of the seating portion 2 is compensated nearly completely by the kinematic construction K and the horizontal orientation of the armrest 6 is nearly maintained.

Figure 4:
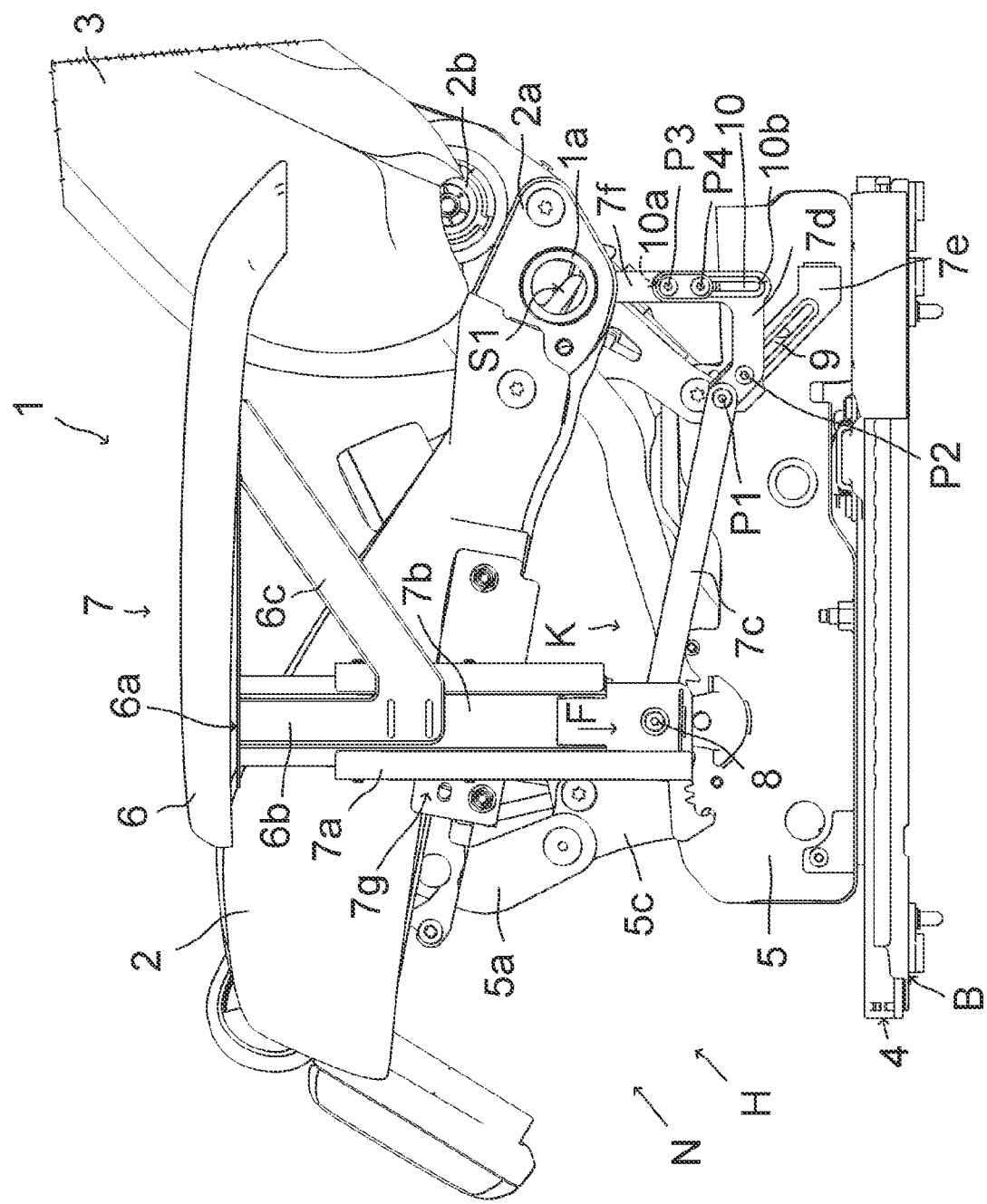
FIG. 4 shows the vehicle seat according to FIG. 1 in a raised position and in a tilted position.

When the vehicle seat 1 is tilted from the upright default position (design position) shown in FIG. 1 via the inclination adjustment means N into a position of maximum tilt and, at the same time, also adjusted to the position of maximum height via the height adjustment means H, this results in the state as shown in FIG. 4, following from a combination of the two previous FIGS. 2 and 3. Thus, in addition to the state in FIG. 3, the connector piece 7d is adjusted diagonally upwards via the connecting piece 7f being in contact with the upper stop 10a of the second long hole 10 (guided by the first long hole 9). Hereby, via the first point P1 the connecting rod 7c is also carried along so that this presses against the armrest guide 7a at the bottom and swivels this slightly forward about the pivot point D (in relation to the state in FIG. 3). Thus, the upward and forward movement of the seating portion 2 resulting from the pivoting of the rear linkage 5b (in relation to the state in FIG. 3), is transferred to the armrest guide 7a via the diagonal movement of the connector piece 7d so that the armrest 6 remains in its horizontal orientation.

This way, it is possible to achieve, by means of the kinematic construction K, that the armrest guide 7a follows any motion of the seating portion 2 or the vehicle seat 1 respectively caused by actuation of the inclination adjustment means N or, respectively, the height adjustment means H, where, to that end, a purposeful movement is transferred to the armrest guide 7a via the connecting rod 7c so as to effect a corresponding rotation about the axis of rotation D. Thus, the seat occupant is able to rest his arm on the armrest 6 always in an approximately horizontal orientation, independent of the position of the vehicle seat 1, for increased comfort.

Comparative vehicle seats may be adjustable in inclination via an inclination adjustment device and/or in height in relation to a floor of the vehicle via a height adjustment device. In the case of the inclination adjustment, for one thing, a common adjustment of the seating portion and the backrest of the vehicle seat about a first pivot axis may be provided or, on the other, an inclination adjustment merely of the backrest in relation to the seating portion so as to adapt the position of the vehicle seat to the respective situation.

Such a comparative adjustment in height and/or adjustment in tilt will always have an influence also on the position of an armrest, if any, attached to the seating portion. For example, when in the course of an adjustment of inclination the inclination of the seat portion is adjusted too, the armrest connected thereto may be adjusted also in its inclination. A disadvantage of this is that, in particular in the case of a steep inclination, the seat occupant will hold his/her arm in a highly angled position which may lead to issues in blood circulation, for example. This highly compromises the comfort, in particular, when the vehicle seat is steeply inclined.

To adjust the comparative armrest on the vehicle seat, the comparative armrests are affixed to the lateral flanks of the seating portion by means of parallelogram kinematics. This allows the angular position of the armrest to be maintained in any position, however, this being the case only in the default position of the vehicle seat because the armrest is held parallel to the alignment of the seating portion.

A comparative vehicle seat is provided which can be brought into a reclined position in which the seating portion is approximately in the same plane as the backrest. Hereby, the comparative armrest is designed as two-piece or, respectively, L shaped and, when brought into the reclined position, is brought into a plane with the seating portion and the backrest, with the support surface of the armrest always being approximately parallel to the seating portion.

A comparative armrest can be flexibly adjusted via various actuators. The comparative armrest is connected to the seating portion via one or two couples. Hereby, the backrest can be swiveled in relation to the seating portion via an actuator unit affixed to the armrest. A comparative armchair-type armrest may be provided which is operatively connected via a four joint kinematics to the backrest and the seat mounting or the bottom part of the seat respectively. When the inclination of the backrest is adjusted the armrest is automatically adjusted upwards or downwards.

It is the object of the present disclosure to create an armrest arrangement as well as a vehicle seat allowing for an automated and comfortable adjustment of an armrest at little expenditure.

This task is solved by an armrest arrangement as well as a vehicle seat according to the independent claims. The sub-claims describe preferred further developments.

Thus, an armrest arrangement for a vehicle seat comprises at least one armrest extending essentially in a longitudinal direction for supporting an arm of a seat occupant and a seating portion connection for connecting the armrest to a seating portion of the vehicle seat such that the armrest can be adjusted in relation to the seating portion vi a kinematic construction or, respectively, a kinematics.

Hereby, the present disclosure provides for the armrest to be connected via a vertical bar to the seating portion connection in a manner pivoting about a pivot point, and a connecting rod guided by a guide element as part of the kinematic construction cooperating with the vertical bar in such a manner that upon movement of the seating portion connection in relation to the guide element a rotation of the armrest about the pivot point can be effected via the connecting rod. Hereby, normally, the seating portion connection is firmly connected to the seating portion so that any movement of the seating portion automatically causes the armrest to swivel or tilt respectively via the kinematic construction.

Hereby, the present disclosure further provides for the connecting rod to be in an operative connection with a seating portion coupling, different from the seating portion connection, in such a way that a rotation of the armrest about the pivot point via the connecting rod can be effected even when the seating portion coupling moves in a vertical direction in relation to the guide element. Therefore, the construction adjusting or, respectively, tilting the armrest is able to "tap" a motion at various points of the seating portion via the seating portion connection and via the seating portion coupling, when these are hinge coupled to the seating portion of the vehicle seat at corresponding different points.

Thus, advantageously, it is possible, using a simple construction, to purposefully cause the armrest to turn upon an inclination or height adjustment of the seating portion of the vehicle seat, where the kinematic construction is preferably designed in such a way, i.e. the connecting rod being guided by the guide element in such a way and being operatively coupled with the seating portion coupling in such a way, that, when the seating portion is adjusted via the inclination adjustment means and/or via the height adjustment means from a default position in any tilt position and/or any lifted position, the orientation of the armrest changes by not more than a maximum of 5°, preferably a maximum of 4°, in relation to the orientation of the armrest when set to the default position. Hereby, tilt position shall be understood as a tilted or inclined position of the entire vehicle seat in which both the seating portion and the backrest are tilted about a common pivot axis.

In contracts hereto, a further inclination adjustment can be realized in that the backrest hinged to the seating portion via fittings can be swiveled in relation to the seating portion about a second pivot axis defined by the fittings. In this case, however, the inclination of the armrest remains unchanged because the seating portion is not swiveled or tilted along, and therefore, likewise, the armrest does not change its orientation. Therefore, preferably, it is provided that the orientation of the armrest can change only when the inclination and/or the height of the seating portion is adjusted. According to the present disclosure, this adjustment of the orientation of the armrest will be compensated almost entirely via the kinematic construction, where the aforementioned change of not more than a maximum of 5°, preferably a maximum of 4°, is acceptable under consideration of comfort in view of the fact that the armrest may incline up to 20° or more. With such small angular positions of less than or equal to 5°, preferably smaller than 4°, the arm of the seat occupant is still tilted so little that any issues with blood circulation and thereby numbness of the hands can be avoided.

Preferably, it is further provided for the guide element to have a first long hole, in which the connecting rod is received in a hinged manner via a first point, the connecting rod being articulately joined, at its end opposite the first point, indirectly or directly to the vertical bar. This way it is possible to provide a simple guide via the first long hole, the first long hole extending angled in relation to the vertical direction and the longitudinal direction. Hereby, advantageously, it is possible to compensate for the swivel motion of the seating portion caused by a height adjustment and/or an inclination adjustment of the seating portion or, respectively, the vehicle seat resulting from a pivoting action of swing arms and linkages. Then, using this type of guide, the orientation of the armrest is approximately maintained.

Preferably, it is further provided that a connector piece is guided in the first long hole of the guide element via the first point and a second point different from the first one, the movement of the piece being coupled via the first point with the movement of the connecting rod. Thus, the kinematic construction is expanded in that the connector piece is also guided by the guide element, while the connector piece further comprises a second long hole extending in a vertical direction in which a connecting piece connected to the seating portion coupling is guided in such a way that movement of the seating portion coupling in a vertical direction is limited by an upper stop being the upper border of the second long hole and by a lower stop being the lower border of the second long hole.

This way, it is possible to create the operative connection between the seating portion coupling and the connecting rod, where the effect of the stops is that movement of the connector piece and therewith a change in motion of the connecting rod will follow only if there is a height adjustment of the seating portion. Moreover, it is then possible, starting from a certain height adjustment, to transfer an adjustment of the seating portion, caused by pivoting movement of the swing arms of the height adjustment means, via a retroactive effect on the connecting rod also to the armrest which thereupon tilts accordingly about the pivot point. Thus, by means of appropriate settings of the stops, the angles and the lengths of the two long holes it is possible to purposefully react to the respective action of the seating portion upon inclination and/or height adjustment.

Preferably, it is further provided for the armrest to be received in an armrest guide via a triangular support comprising the vertical rod, preferably via an armrest connection, and for the connecting rod to be hinged to the underside of the armrest guide in such a way that via the connecting rod a rotation of the armrest guide and the armrest received therein about the pivot point can be effected, when
- the seating portion connection moves in relation to the guide element and/or
- the seating portion coupling moves in a vertical direction in relation to the guide element. This way, it is possible to allow for a flexible attachment of the armrest, wherein the armrest is also supported towards the rear.

Hereby, preferably, it is also provided that the armrest is guided in the armrest guide via the armrest connection in a rail-type manner along a guide direction for adjusting the armrest in relation to the armrest guide, where the armrest connection can be fixed within the armrest guide for defining the position of the armrest relative to the armrest guide. This way kt is possible, for example, to purposefully adapt the armrest in its default position to a size of the seat occupant.

The vehicle seat according to the present disclosure comprises a seating portion, a backrest and an armrest essentially extending in a longitudinal direction as part of an armrest arrangement, in particular, of an armrest arrangement according to the present disclosure, where the seating portion and the backrest
- can be tilted together via an inclination adjustment means about a first pivot axis in relation to a seat mount, and/or
- can be adjusted via a height adjustment means in a vertical direction in relation to the seat mount,
- where the armrest is connected to a seating portion connection via a vertical bar in a manner rotatably about a pivot point, and the seating portion connection is firmly connected to the seating portion, and
- where a guide element is affixed to the seat mount, and a connecting rod guided by the guide element collaborates as part of a kinematic construction with the vertical bar in such a way that upon movement of the seating portion in relation to the seat mount a rotation of the armrest about the pivot point can be effected via the connecting rod,
- where, further, a seating portion coupling is hinged to the seating portion, the connecting rod being in operative connection with the seating portion coupling different from the seating portion connection in such a way that via the connecting rod a rotation of the armrest about the pivot point can be effected even when the seating portion with the seating portion coupling moves in a vertical direction in relation to the seat mount.

Thus, the armrest arrangement according to the present disclosure may be incorporated in a corresponding vehicle seat so that the orientation of the armrest will be adapted automatically upon movement of the seating portion in that a corresponding tilt movement of the seating portion is compensated via the guided connecting rod.

Hereby, preferably, it is provided that the seating portion coupling can move only in a vertical direction and the seating portion coupling is hinged onto the seating portion in such a way that the seating portion coupling does not move when the seating portion and the backrest are jointly tilted via the inclination adjustment means about the first pivot axis in relation to the seat mount. Therefore, any movement of the seating portion will be transferred via the seating portion coupling to the kinematic construction when it results in a height adjustment during which the seating portion is pivoted via swing arms. Thus, an inclination adjustment of the seating portion can be compensated by pivoting the connecting rod alone, while a height adjustment and the resulting swiveling motion of the seating portion is also compensated by an adjustment of the connecting rod guided by the guide element.

Hereby, preferably, it is further provided for the seating portion coupling to be mounted in a gliding manner on a cross member connecting the lateral flanks of the seating portion, where, preferably, the first pivot axis runs coaxially in relation to the cross member. Thus, the height adjustment of the backrest can be tapped via already existing components and transferred to the kinematic construction, whereby the cross member remains unchanged upon an inclination adjustment thereby resulting in no retroactive effect on the kinematic construction in the case of a pure inclination adjustment.

Preferably, it is further provided for the seat mount fest to be firmly affixable to the floor of a vehicle or to a rail system affixable to the floor for adjusting the vehicle seat in a longitudinal direction. This way, it is possible to affix the guide element to a component of the vehicle seat which does not move upon inclination and/or height adjustment, the result of this being, in a simple manner, a guided movement of the connecting rod upon any adjustment of the seating portion, and, thereby, the automatic alignment of the armrest.

The present disclosure relates to an armrest arrangement (7) for a vehicle seat (1) including an armrest (6) and a seating portion connection (7g) for connecting the armrest (6) to a seating portion (2) in such a way that the armrest (6) can be adjusted via a kinematic construction (K) in relation to the seating portion (2).

The present disclosure provides for the armrest (6) to be connected via a vertical bar (6b) to the seating portion connection (7g) in a manner rotatable about a pivot point (D), and a connecting rod (7c) guided by a guide element (7e) being in operative connection with the vertical bar (6b) as part of the kinematic constructions (K) in such a way that upon movement of the seating portion connection (7g) in relation to the guide element (7e) a rotation of the armrest (6) about the pivot point (D) can be effected via the connecting rod (7c), the connecting rod (7c) further being in operative connection with a seating portion coupling (11) different from the seating portion connection (7g) in such a way that rotation of the armrest (6) about the pivot point (D) can be effected via the connecting rod (7c) even when the seating portion coupling (11) moves in a vertical direction (V) in relation to the guide element (7e).

The invention claimed is:

1. An armrest arrangement for a vehicle seat including comprising:
   an armrest arranged to extend in a longitudinal direction for supporting an arm of a seat occupant and
   a seating portion connection for connecting the armrest with a seating portion of the vehicle seat in such a manner that the armrest can be adjusted via a kinematic construction in relation to the seating portion,
   wherein the armrest is connected to the seating portion connection via a vertical bar in a manner twistable about a pivot point, and a connecting rod guided by a guide element as part of the kinematic construction collaborates with the vertical bar in such a way that, when the seating portion connection is moved in relation to the guide element, the connecting rod may cause the armrest to swivel about the pivot point so as to maintain an orientation of the armrest when the seating portion is tilted, the connecting rod further being in operative connection to a seating portion coupling different from the seating portion connection in such a way that any rotation of the armrest about the pivot point can be effected via the connecting rod even when the seating portion coupling moves in a vertical direction in relation to the guide element so as to maintain an orientation of the armrest upon height adjustment of the seating portion.

2. The armrest arrangement of claim 1, wherein the kinematic construction adjusting the armrest can be hinged via the seating portion connection and via the seating portion coupling at different points onto a seating portion of the vehicle seat.

3. The armrest arrangement of claim 1, wherein the guide element comprises a first long hole in which the connecting rod is articulately received via a first point, the end opposite the first point of the connecting rod being indirectly or directly connected to the vertical bar.

4. The armrest arrangement of claim 3, wherein the first long hole runs angled in relation to the vertical direction and the longitudinal direction.

5. The armrest arrangement of claim 3, wherein in the first long hole of the guide element a connector piece is guided via the first point and a second point separate from this, the movement of the piece being coupled via the first point with the movement of the connecting rod.

6. The armrest arrangement of claim 5, wherein the connector piece comprises a second long hole extending in a vertical direction, in which a connecting piece connected to the seating portion coupling is guided in such a way that any movement of the seating portion coupling in a vertical direction is limited by an upper stop bordered at the top by the second long hole and a lower stop bordering the second long hole at the bottom.

7. The armrest arrangement of claim 1, wherein the armrest is received in an armrest guide via a triangular support comprising the vertical bar, and the connecting rod is hinged to the underside of the armrest guide in such a way that rotation of the armrest guide and the armrest contained therein about the pivot point can be effected via the connecting rod, when the seating portion connection is moved in relation to the guide element and/or the seating portion coupling is moved in a vertical direction in relation to the guide element.

8. The armrest arrangement of claim 7, wherein the armrest is guided in the armrest guide via the armrest connection in a rail-type manner along a guide direction for adjusting the armrest in relation to the armrest guide, the armrest connection being fixable within the armrest guide to define the position of the armrest relative to the armrest guide.

9. The armrest arrangement of claim 1, wherein the armrest is arranged to extend essentially in the longitudinal direction.

10. A vehicle seat comprising:
a seating portion,
a backrest, and
an armrest arranged to extend in a longitudinal direction, as part of an armrest arrangement, where the seating portion and the backrest can be jointly tilted, via an inclination adjustment means, about a first pivot axis in relation to a seat mount, and/or can be adjusted via a height adjustment means in a vertical direction in relation to the seat mount,
wherein the armrest is coupled via a vertical bar, in a manner rotatable about a pivot point, with a seating portion connection, and the seating portion connection being coupled with the seating portion, and
wherein a guide element is mounted on the seat mount, and a connecting rod guided by the guide element collaborates as part of a kinematic construction with the vertical bar in such a way that upon movement of the seating portion in relation to the seat mount a rotation of the armrest about the pivot point can be effected by the connecting rod,
wherein a seating portion coupling is hinged onto the seating portion, the connecting rod being in operative connection with the seating portion coupling different from the seating portion connection in such a way that a rotation of the armrest about the pivot point can be effected via the connecting rod even when the seating portion with the seating portion coupling moves in a vertical direction in relation to the seat mount.

11. The vehicle seat of claim 10, wherein the seating portion coupling is able to move merely in a vertical direction, and the seating portion coupling is hinged onto the seating portion in such a way that the seating portion coupling does not move when the seating portion and the backrest are jointly tilted via the inclination adjustment means about the first pivot axis in relation to the seat mount.

12. The vehicle seat of claim 10, wherein the armrest is arranged to extend essentially in the longitudinal direction.

13. The vehicle seat of claim 10, wherein the seat mount can be rigidly connected with the floor of a vehicle or is mounted on a rail system mountable on the floor for adjusting the vehicle seat in a longitudinal direction.

14. The vehicle seat of claim 10, wherein the backrest can be tilted in relation to the seating portion about a second pivot axis different from the first pivot axis, where the connecting rod causes no rotation of the armrest about the pivot point when only the backrest is tilted about the second pivot axis.

15. The vehicle seat of claim 10, wherein the connecting rod is guided by the guide element in such a way and is in operative connection with the seating portion coupling in such a way that, when the seating portion is adjusted via the inclination adjustment means and/or via the height adjustment means from a default position to any tilted position and/or any raised position, the orientation of the armrest changes by no more than a maximum of 5° in relation to the orientation of the armrest when in its default position.

16. The vehicle seat of claim 10, wherein the seating portion is connected on both sides to the seat mount via front swing arms and guiders as well as via rear swing arms, the inclination adjustment means being designed to swivel the front swing arms and the guiders hinged onto them for an inclination adjustment of the seating portion, and the height adjustment means being configured to swivel the front swing arms and the rear swing arms for a height adjustment of the seating portion in a vertical direction.

17. The vehicle seat of claim 10, wherein the seating portion coupling mounted in a gliding manner on a cross member connecting the lateral flanks of the seating portion.

18. The vehicle seat of claim 17, wherein the first pivot axis runs coaxially in relation to the cross member.

* * * * *